United States Patent
Louch

(10) Patent No.: US 9,811,250 B2
(45) Date of Patent: Nov. 7, 2017

(54) DEVICE, METHOD, AND GRAPHICAL USER INTERFACE FOR DISPLAYING WIDGETS

(71) Applicant: Apple Inc., Cupertino, CA (US)

(72) Inventor: John O. Louch, San Luis Obispo, CA (US)

(73) Assignee: APPLE INC., Cupertino, CA (US)

( * ) Notice: Subject to any disclaimer, the term of this patent is extended or adjusted under 35 U.S.C. 154(b) by 231 days.

(21) Appl. No.: 14/502,953

(22) Filed: Sep. 30, 2014

(65) Prior Publication Data

US 2015/0346957 A1 Dec. 3, 2015

Related U.S. Application Data

(60) Provisional application No. 62/006,097, filed on May 31, 2014.

(51) Int. Cl.
| | |
|---|---|
| *G06F 3/048* | (2013.01) |
| *G06F 3/0484* | (2013.01) |
| *G06F 3/0482* | (2013.01) |
| *G06F 3/0485* | (2013.01) |
| *G06F 9/44* | (2006.01) |
| *G06F 9/445* | (2006.01) |

(52) U.S. Cl.
CPC ........ *G06F 3/04842* (2013.01); *G06F 3/0482* (2013.01); *G06F 3/0485* (2013.01); *G06F 9/4443* (2013.01); *G06F 8/61* (2013.01)

(58) Field of Classification Search
CPC ...... G06F 3/017; G06F 3/048–3/04886; G06F 2203/04803
See application file for complete search history.

(56) References Cited

U.S. PATENT DOCUMENTS

| | | | |
|---|---|---|---|
| 2002/0038230 A1* | 3/2002 | Chen ................. | G06F 17/30554 705/7.11 |
| 2006/0277469 A1 | 12/2006 | Chaudhri et al. | |
| 2007/0118813 A1* | 5/2007 | Forstall ................. | G06F 3/0486 715/805 |
| 2009/0150822 A1* | 6/2009 | Miller ................... | G06F 3/0485 715/784 |
| 2009/0260022 A1* | 10/2009 | Louch .................... | B60K 35/00 719/328 |
| 2011/0252357 A1* | 10/2011 | Chaudhri ............ | G06F 3/04883 715/780 |
| 2012/0005577 A1* | 1/2012 | Chakra ................. | G06F 3/0486 715/702 |
| 2012/0278725 A1* | 11/2012 | Gordon .............. | H04N 21/2665 715/738 |
| 2014/0298257 A1* | 10/2014 | Grandhi ................ | G06F 3/0484 715/808 |

OTHER PUBLICATIONS

PCT International Search Report and Written Opinion for PCT/US2015/029667, Aug. 20, 2015, 9 Pages.

* cited by examiner

*Primary Examiner* — Claudia Dragoescu

(74) *Attorney, Agent, or Firm* — Ronald Fernando

(57) ABSTRACT

As a user's needs change over time, the widgets displayed in a widget display area are altered by the user to better suit the desires of the user. Further, the widgets selected for display can be configured as desired by the user to display information in different ways. In order to reduce clutter within the widget display area itself, electronic devices can include a user interface that facilitates ease of accessing, adding, removing, and configuring the widget display area and the widgets therein as desired by the user.

48 Claims, 12 Drawing Sheets

DEVICE, METHOD, AND GRAPHICAL USER INTERFACE FOR DISPLAYING WIDGETS

CROSS REFERENCE TO RELATED APPLICATIONS

This application claims the benefit of U.S. Provisional Application 62/006,097, filed May 31, 2014, which is incorporated by reference herein in its entirety.

TECHNICAL FIELD

This relates generally to electronic devices with an input/output interface, including but not limited to electronic devices with input means for manipulating the display of widgets.

BACKGROUND

The use of touch-sensitive surfaces as input devices for computers and other electronic computing devices has increased significantly in recent years. Exemplary touch sensitive surfaces include touch pads and touch screen displays. Such surfaces, along with traditional input devices such as a mouse and keyboard, are widely used to detect inputs for manipulating content objects displayed on the computer or other electronic computing device.

Content objects include digital images, video, text, icons, applications, buttons, and other graphics. The display of the content objects and manipulation of the content objects is often cumbersome and inefficient. For example, a user must often navigate through a sequence of menus to open/close/configure a particular content object and repeat the process for subsequent content objects the user whishes to view or interact with which creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for accessing and displaying information associated with content items. Such methods and interfaces optionally complement or replace conventional methods for manipulating the display content objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. In other embodiments, a method is performed at an electronic device with a display and other input means such as a mouse or keyboard. The touch-sensitive surface is configured to receive an input as a selection of a particular display element with a finger or stylus contacting the touch-sensitive surface either through tapping or otherwise engaging (e.g., a tactile click) of the touch-sensitive surface with an indirect selection means (e.g., a pointer) positioned over the display element or directly in the case of a touch-sensitive display where the selection means is the finger or stylus engaging the touch-sensitive display at the location of the display element. Alternatively, the touch-sensitive surface receives an input as a gesture (movement) of a finger, stylus, or plurality thereof contacting the touch-sensitive surface. The method includes: displaying the widget display area in a first state that comprises a first region displaying a plurality of active widgets. Active widgets include a visual indication of a state of the widget or content item associated with the widget which includes the visual display of notification data, weather data, stock data, or other data or functions of the widget or content item based on a configuration of the widget. In response to an input while the widget display area is displayed in the first state, the widget display area is displayed in a second state comprising the first region and a second region. In some embodiments, a transition from the first state to the second state is animated by expanding the widget display area to include the second region. The second region comprises a plurality of representation of widgets that are available for adding to the first region. In response to an input while the widget display area is displayed in the second state, the widget display can be displayed in the first state, a widget can be added to the active display area, or a widget can be removed from the active display area. In some embodiments, a transition from the second state to the first state is animated by collapsing the widget display area to remove the second region.

In accordance with some embodiments, in response to the input while the widget display area is displayed in the second state, a target widget in the plurality of representations of widgets available for adding to the first region is added amongst the plurality of active widgets displayed in the first region. Further, in response to the input, the target widget can be removed from the plurality of representations of widgets available for adding to the first region. In response to another input while the widget display area is displayed in the second state, the widget display area is displayed in the first state comprising the first region, the first region displaying the plurality of active widgets and the target widget in an active state.

In accordance with some embodiments, in response to the input while the widget display area is displayed in the second state, a target widget in the plurality of active widgets is removed. The target widget is displayed amongst the plurality of representation of widgets in the second region available for adding to the first region. In response to another input while the widget display area is displayed in the second state, the widget display area is displayed in the first state comprising the first region, the first region displaying the plurality of active widgets less the target widget.

In accordance with some embodiments, an electronic device includes a display, a touch-sensitive surface or other input means, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface or other input means, a memory, and one or more processors to execute one or more programs stored in the memory includes one or more of the elements displayed in any of the methods described above, which are manipulated in response to inputs, as described in any of the methods described above. In accordance with some embodiments, a computer readable storage medium has stored therein instructions which when executed by an electronic device with a display, a touch-sensitive surface or other input means, cause the device to perform the operations of any of the methods referred described above. In accordance with some embodiments, an electronic device includes: a display, a touch-sensitive surface or other input means, and means for performing the operations of any of the methods described above. In accordance with some embodiments, an information processing apparatus, for use in an electronic device with a display and a touch-sensitive surface or other input means, includes means for performing the operations of any of the methods described above.

DETAILED DESCRIPTION

Figure 1A:
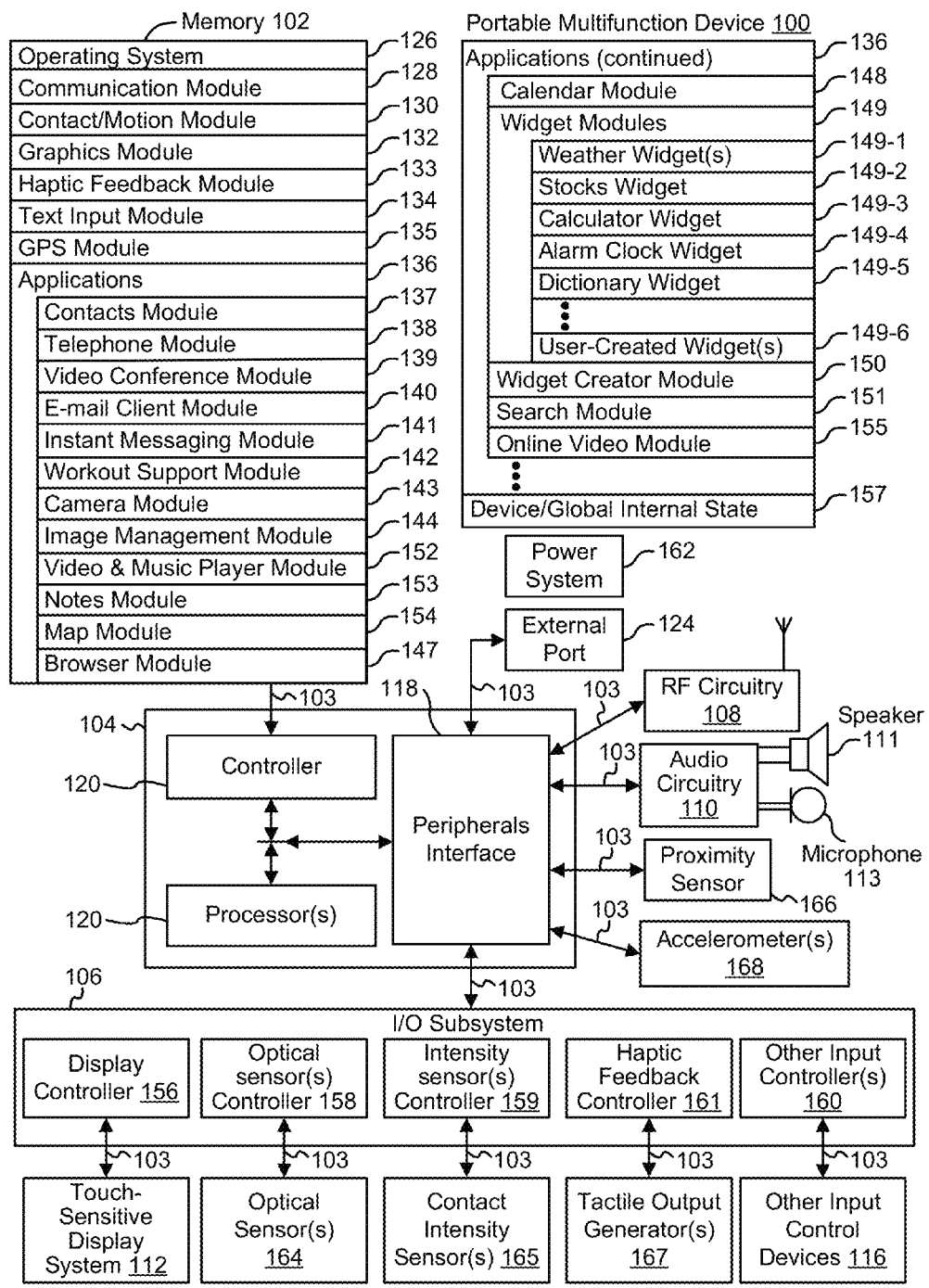
FIG. 1A is a block diagram illustrating a portable multifunction device with a touch-sensitive display in accordance with some embodiments.

Many electronic devices have graphical user interfaces that include a large number of content objects and user interface elements such as electronic messages, photos, audio files, video files, text, hyperlinks, icons, applications, buttons, and/or visual representations thereof. Many of these content objects have associated metadata (e.g., time and/or date stamps, file sizes, author identification, state information, and security settings), which are often informative to the user. Some methods for accessing content objects and/or metadata associated with content objects require a sequence of user inputs that navigate in a menu system. For example, with these methods, a user might need to select a content object to display a menu, open the content object, or bring the content object to the foreground of the display to view desired information about, view information in, or perform a function with the content item. An electronic device can, by default, continuously display larger numbers of content objects and/or metadata associated with displayed content objects. This clutters a display and can be distracting for users, which reduces the efficiency of the user when using the device.

To simplify a user's interaction with user interfaces containing large numbers of content objects, electronic devices can include a widget display area that contains a number of widget interface elements displaying information or providing functions frequently desired by the user. A widget can function as a standalone widget or be associated with a content object. For example, an application can be associated with a widget. In one specific example, a messaging application can be associated with a widget that displays recently received messages in the widget display area. In another specific example, a calendar application can be associated with a widget that displays a date and any upcoming calendar entries stored in association with the date by the calendar application in the widget display area. An example of a standalone widget is a weather widget. The weather widget can receive or retrieve weather information associated with a particular geographic location for display to the user in the widget display area. Thus, the widgets can poll or receive data from $3^{rd}$ party sources (e.g., for weather information) to readily display up to date information to the user. Other examples of widgets are discussed at length herein.

In addition to simplify a user's interaction with user interfaces containing large numbers of content objects by including a widget display, user interactions with the widget display area and widgets themselves can be improved. For example, as the user's needs change over time, the widgets displayed in the displayed area can be altered by the user to better suit the desires of the user. Further, the widgets selected for display can be configured as desired by the user to display information in different ways. In order to reduce clutter within the widget display area itself, electronic devices can include a user interface that facilitates ease of accessing, adding, removing, and configuring the widget display area and the widgets therein as desired by the user.

Figure 4A:
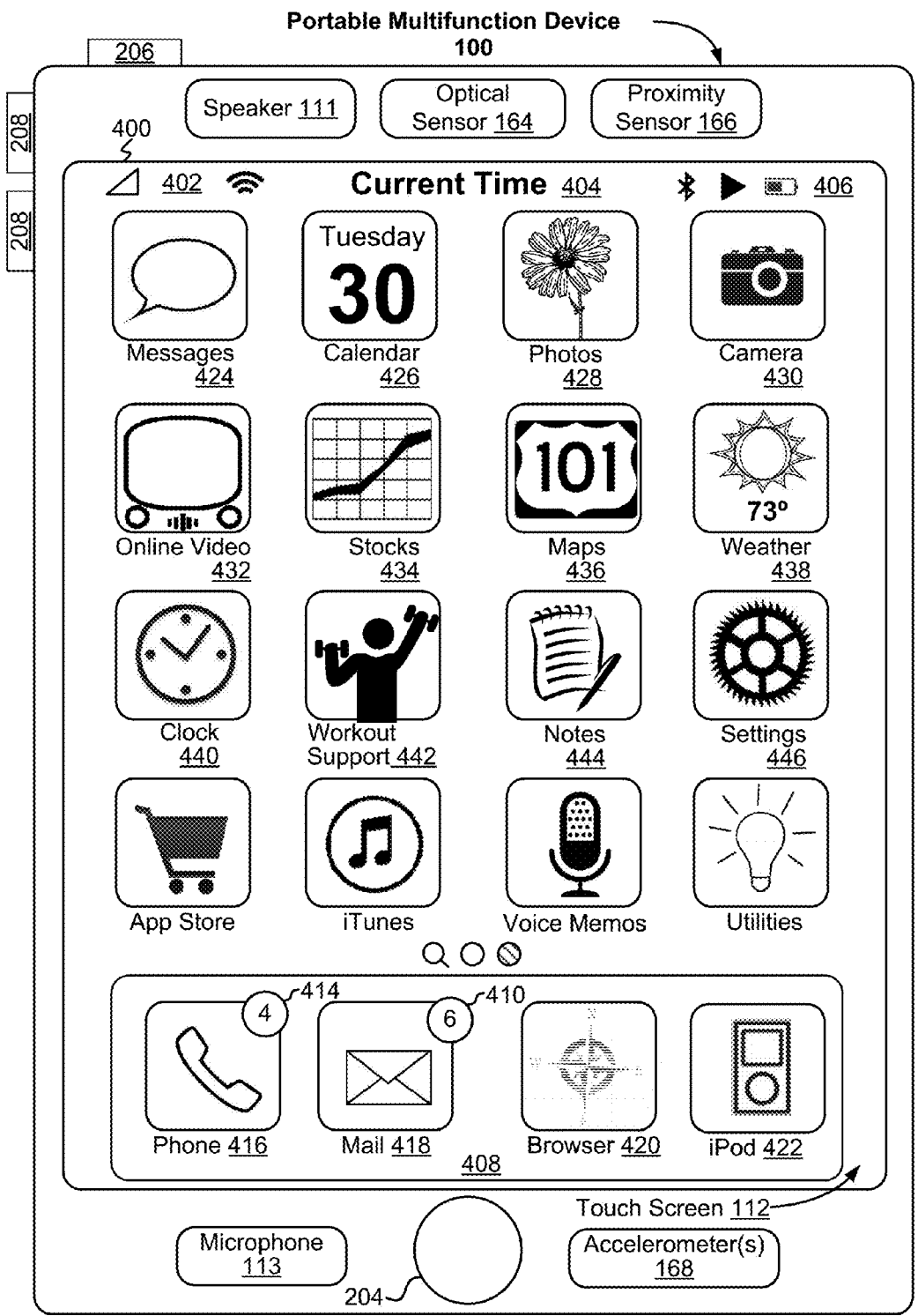
FIG. 4A illustrates an exemplary user interface for a menu of applications on a portable multifunction device in accordance with some embodiments.
Figure 4B:
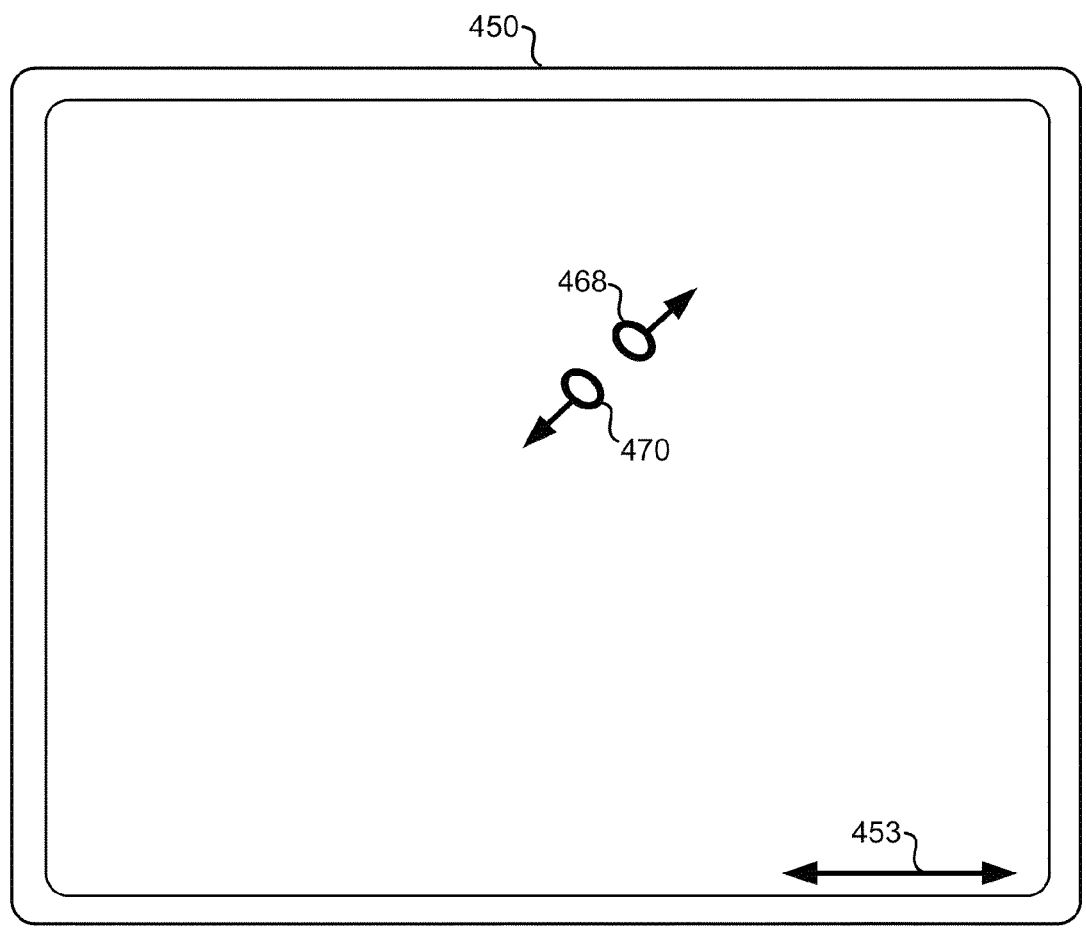
FIG. 4B illustrates an exemplary user interface for a multifunction device with a touch-sensitive surface that is separate from the display in accordance with some embodiments.
Figure 4B:
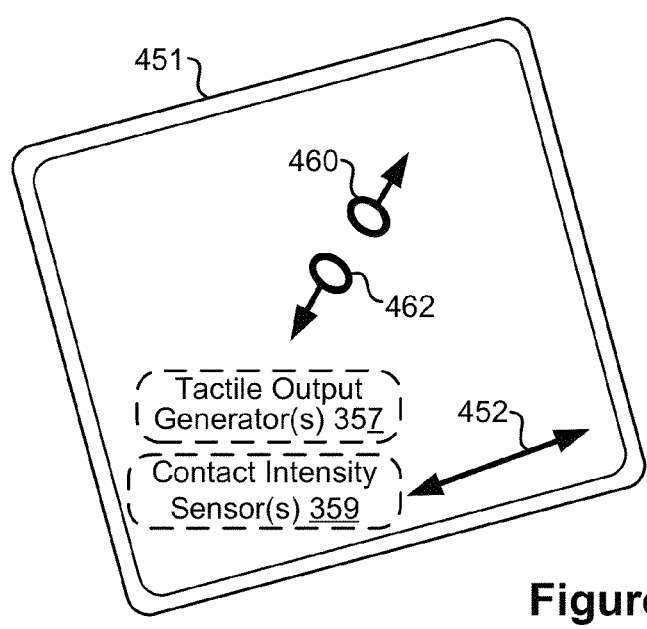
Figure 5:
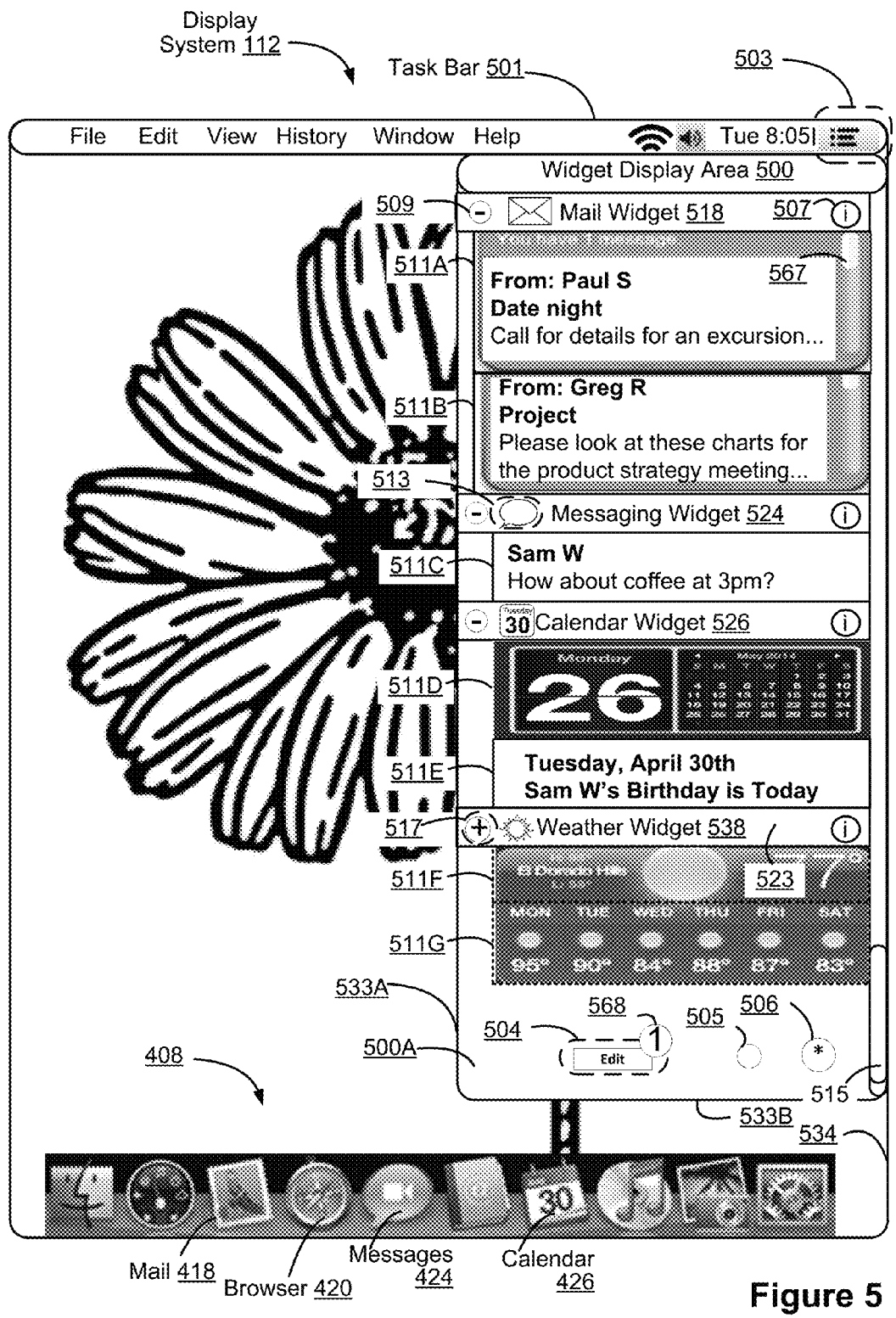
FIG. 5 illustrates an exemplary user interface of an active widget display area in a first state in accordance with some embodiments.
Figure 6A:
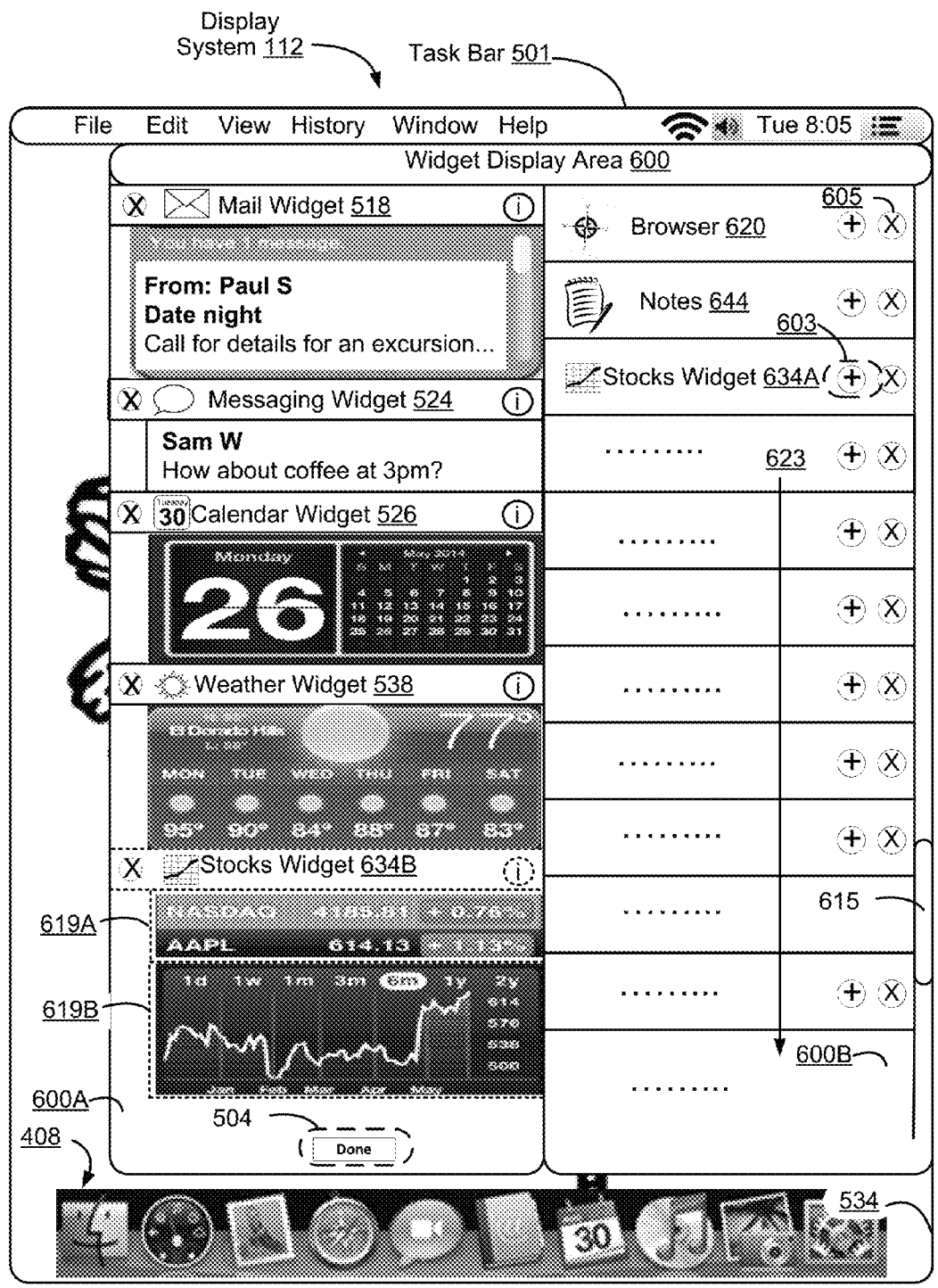
FIG. 6A illustrates an exemplary user interface of a widget display area in a second state for adding an active widget for display in the widget display area in accordance with some embodiments.
Figure 6B:
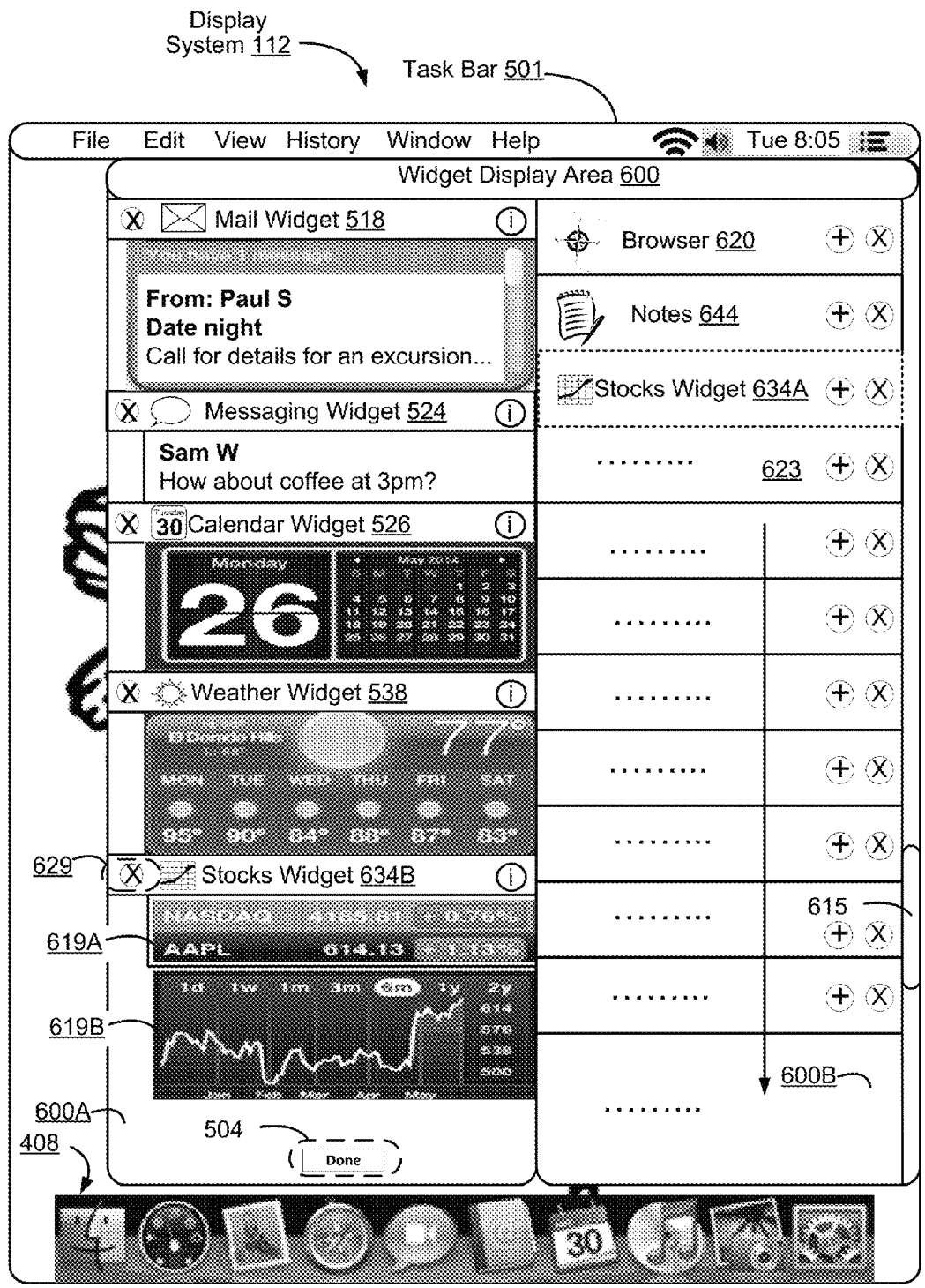
FIG. 6B illustrates an exemplary user interface of a widget display area in a second state for removing an active widget displayed in the widget display area in accordance with some embodiments.
Figure 7:
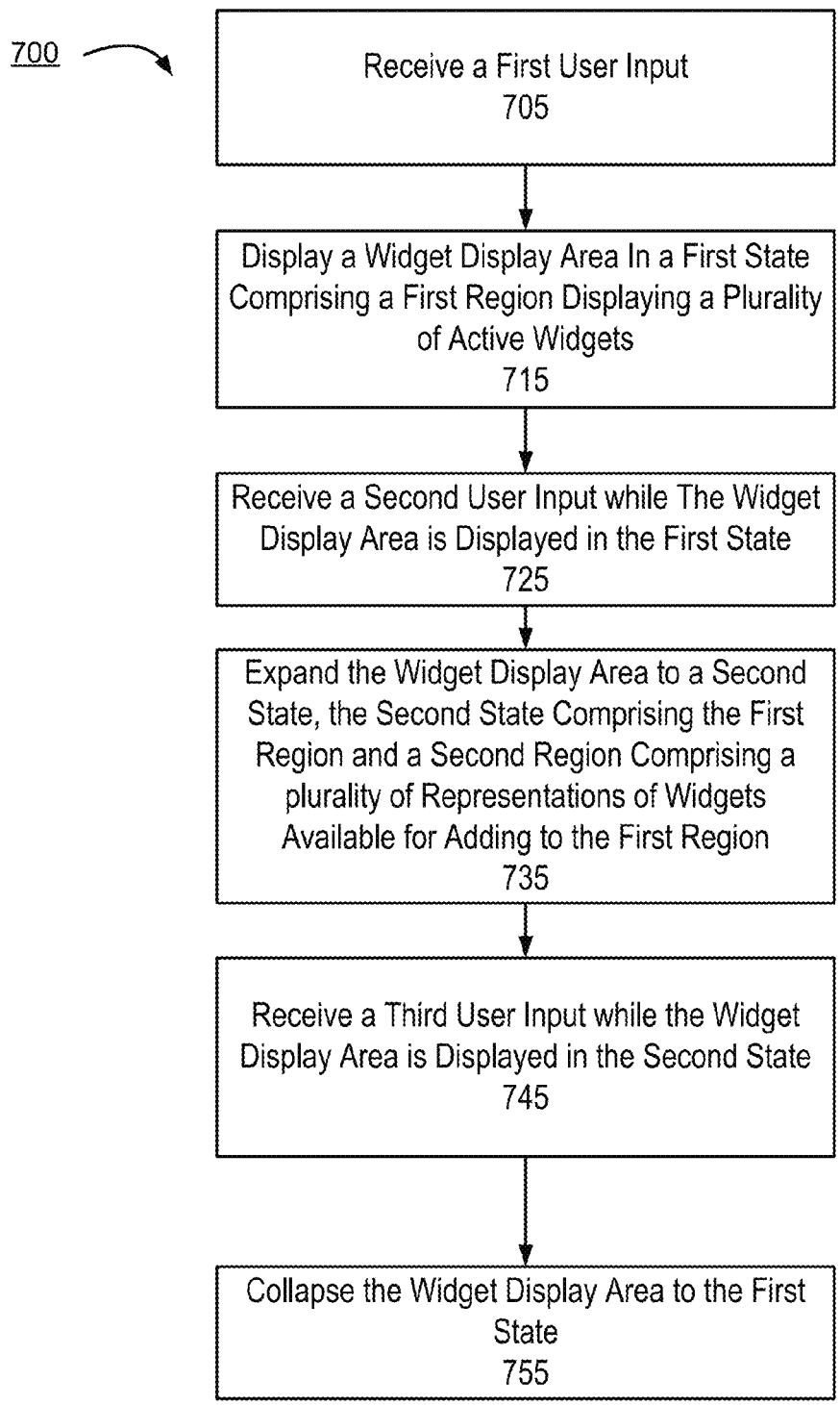
FIG. 7 is a flow diagram illustrating a method for displaying an active widget display area and transitioning the widget displayed area between a first state and a second state in accordance with some embodiments.
Figure 8A:
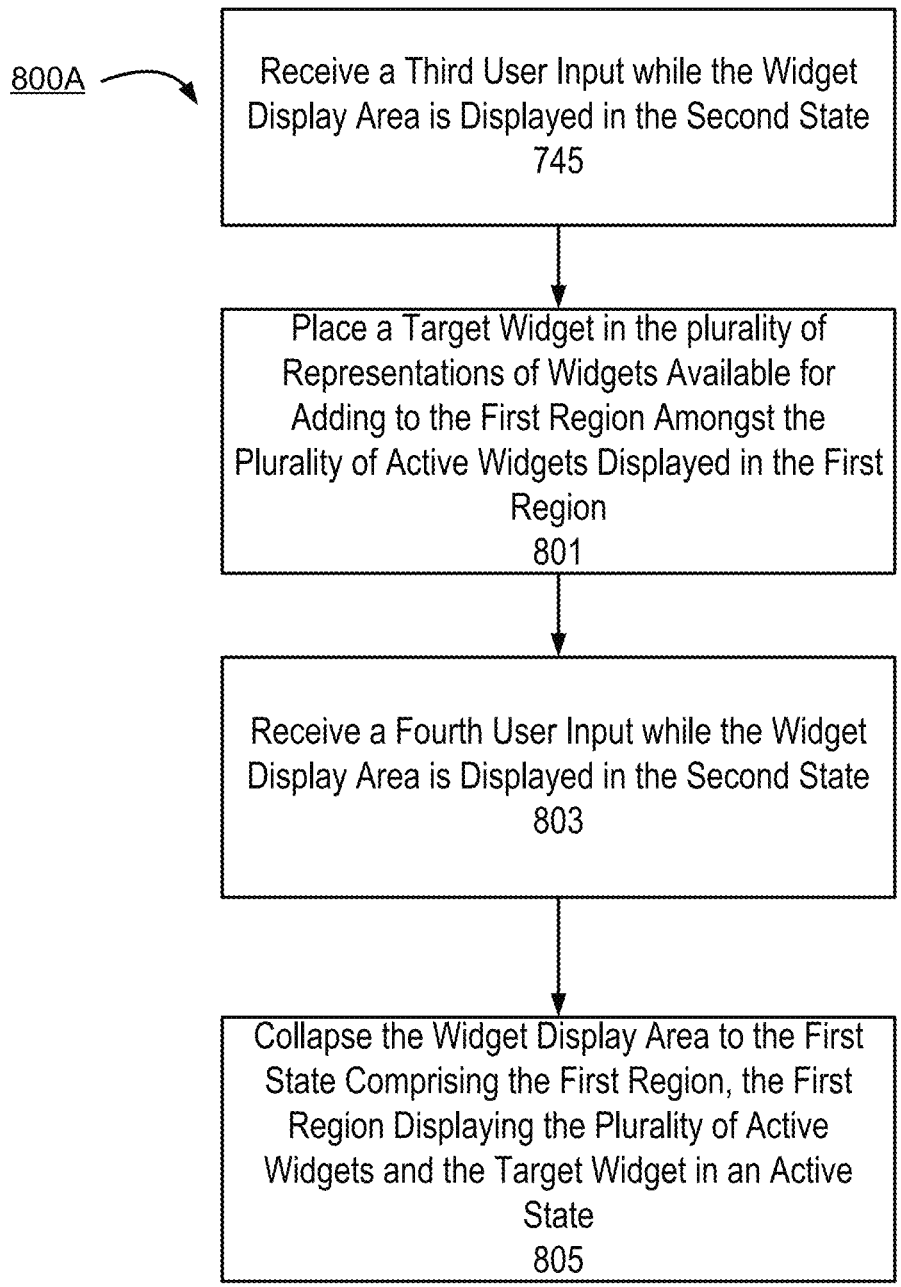
FIG. 8A is a flow diagram illustrating a method for adding a widget for display in a widget display area in accordance with some embodiments.
Figure 8B:
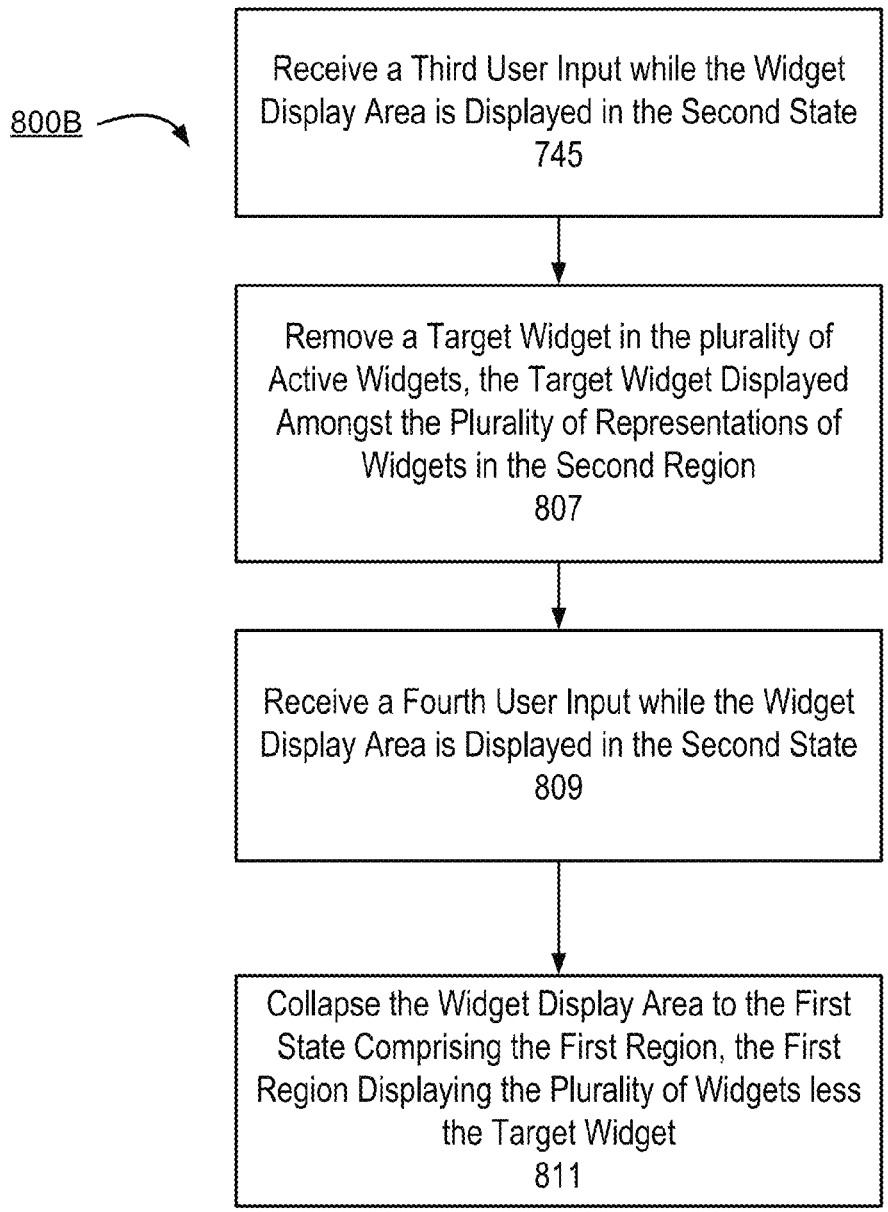
FIG. 8B is a flow diagram illustrating a method for removing a widget from display in a widget display area in accordance with some embodiments.

Below, FIGS. 1A, 1B, 2, and 3 provide a description of exemplary devices. FIGS. 4A and 4B illustrate exemplary user interfaces for a multifunction device. FIGS. 5, 6A and 6B illustrate exemplary user interfaces of a widget display area in accordance with some embodiments. FIGS. 7, 8A, and 8B are methods for accessing and performing operations within the widget display area described in FIGS. 5, 6A and 6B, respectively, in according with some embodiments.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad) or other input means (e.g., a mouse or keyboard based input or stylus input).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display (or display system, which may or may not be touch sensitive depending on the embodiment) 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. IA and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6, configuring widget modules 149, and generating a widget display area (described in more detail with reference to FIGS. 5, 6A, and 6B) for displaying a number of widgets 149;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded (e.g., as standalone widgets or are included in an application package with a corresponding application) and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In addition, the widget creator module 150 controls generation of a widget display area (described in more detail with reference to FIGS. 5, 6A, and 6B) for displaying a number of widgets 149, including user-created widgets 149-6 on the display system 112. For example, the widget creator module 150 interfaces with the GUI updater 178 (described in greater detail below) to display and update the display of widget modules 149 in the widget display area.

In some embodiments, the widget creator module 150 detects the installation of an application and determines whether a widget module 149 associated with the application is available. If a widget module 149 associated with the application is available, the widget creator module 150 can install the widget module 149 and include the widget module 149 in a listing of available widgets, or the associated widget can automatically be added in response to the installation. The widget creator module 150 can install the widget module 149 from a local location or retrieve the widget module 149 from a remote location specified by the application. In addition, the widget creator module 150 can generate a visual notification indicating when a new widget module 149 is available.

The widget modules 149 themselves can include configuration options and retrieve information from an external source. For example, a widget module 149 can poll or receive push data from an external source comprising weather data, stock data, time data, etc. Additionally, a widget module 149 can interface with applications on the device 300 to receive information such as recent messages including email or text messages, calendar entries, currently playing media files, etc. Each widget module 149 can include a default configuration that can be altered by the user as desired to configure the information the widget displays and functionality of the widget. The altered configuration can be stored as a new default configuration of the widget module 149 such that a widget removed from, and then added again to the widget display area retains the same configuration.

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
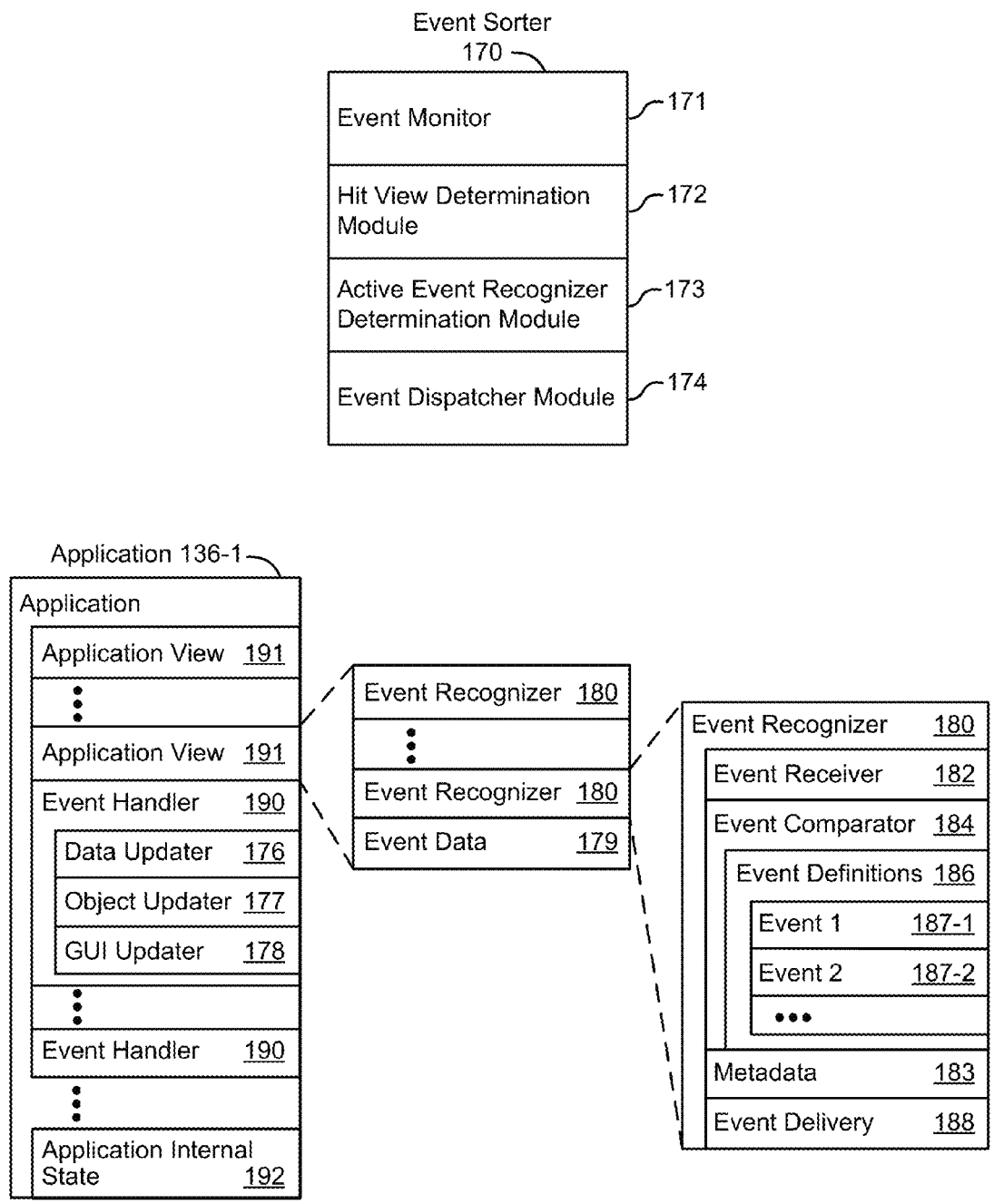
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
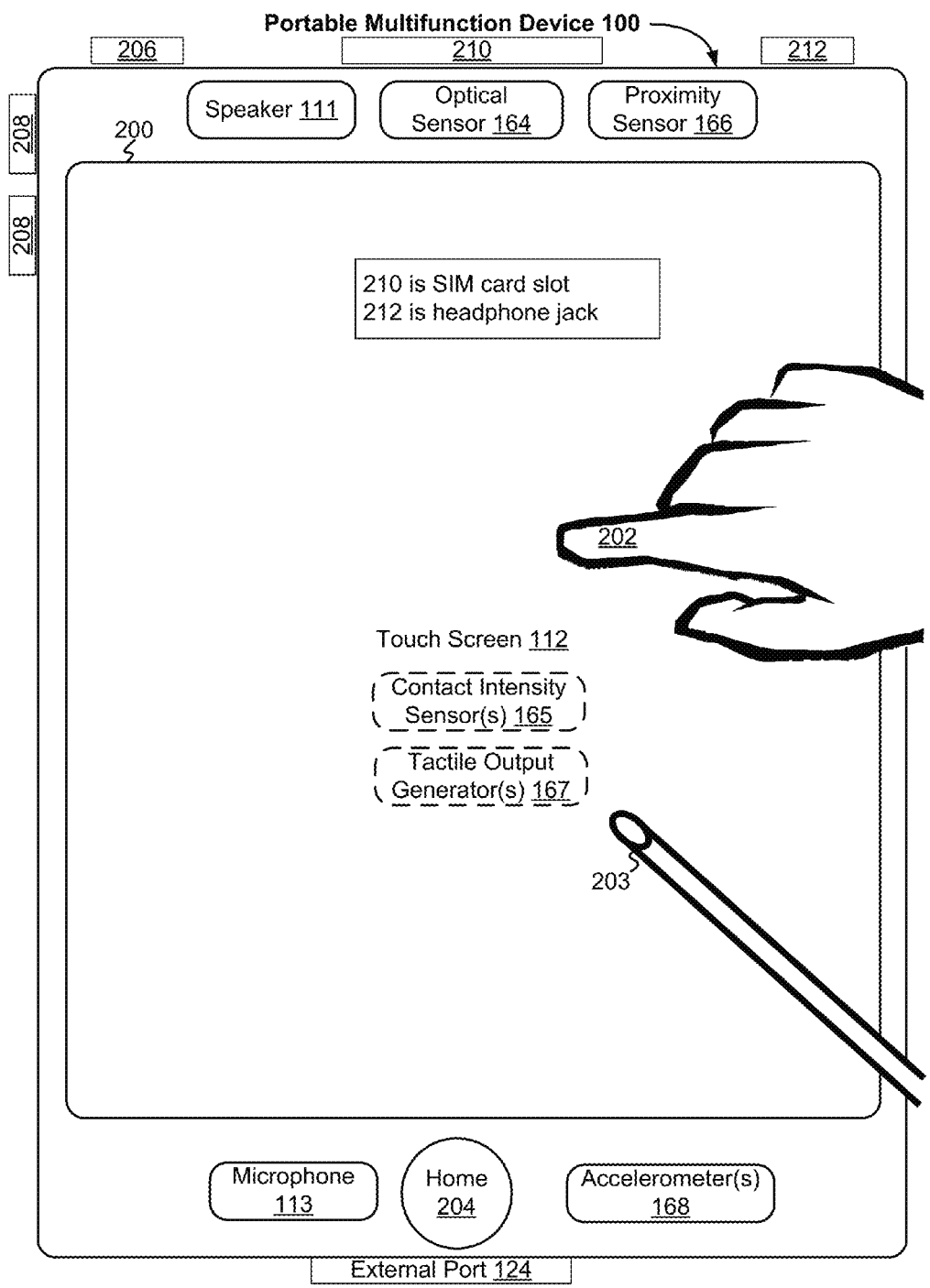
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 3:
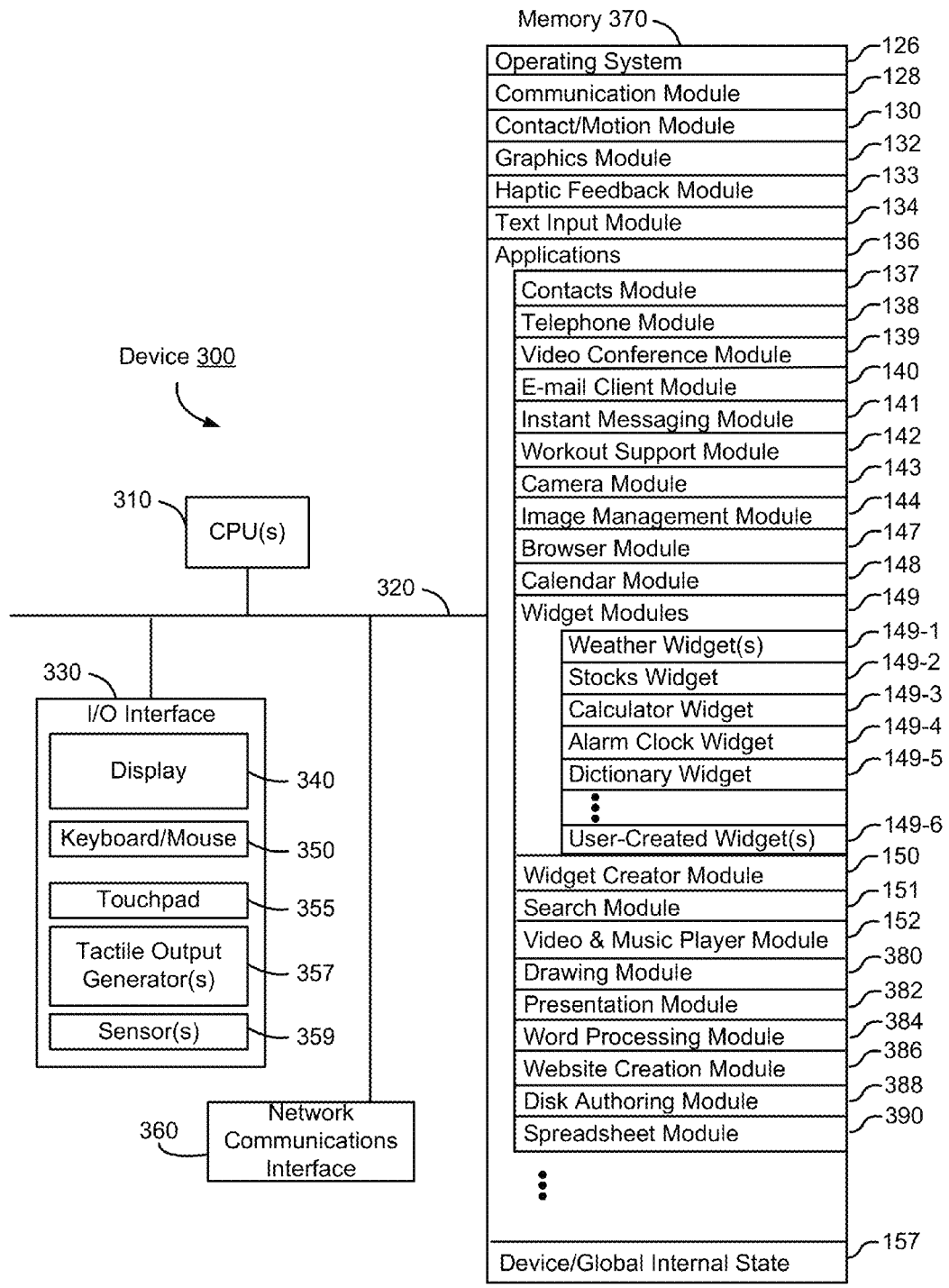
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Text;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element or content object (e.g., a button, window, widget, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that can be implemented on an electronic device with a display and a touch-sensitive surface or other input device, such as device 300 or portable multifunction device 100.

FIGS. 5, 6A, and 6B illustrate exemplary user interfaces for manipulating the display of widgets in accordance with some embodiments. The user interfaces in these figures are used to illustrate the processes described below, including the processes in FIGS. 7, 8A, and 8B.

FIG. 5 depicts an exemplary user interface of an active widget display area 500 in a first state comprising active widgets in accordance with some embodiments. As shown, the display system 112 can display a GUI including the widget display area 500. The widget display area 500 is part of a notification center for the device according to some embodiments. The user interface can also include a task bar 501 presenting various options to the user and a tray 408 with icons for frequently used applications, such as a mail icon 418, calendar icon 426, browser icon 420, and messages icon 424. These applications can have associated widgets that a user can add to the widget display area 500.

The display system 112 need not always display the widget display area 500. In response to user inputs, the GUI updater 178 can show or hide the widget display area 500 on the display system 112. For example, as illustrated in FIG. 5, the user interface includes a task bar 501 with a widget display toggle element 503. Users can engage the widget display toggle element 503 (e.g., selecting the toggle 503 via a touch-surface or other input means such as a keyboard button or mouse) to show or hide the widget display area 500.

Other means to receive user input for showing or hiding the widget display area 500 are also contemplated throughout the detailed description and below. For example, the widget display area 500 can be anchored to a corner or side of the user interface. As shown in FIG. 5, the widget display area can be considered as anchored to the right hand edge 534 of the user interface. As such, the user can swipe or drag a focus selector left to right from a left position proximate to an edge 533A of the widget display area 500 to hide the widget display area 500. With the widget display area 500 hidden, the user can swipe or drag a focus selector from a right position proximate to edge 534 of the user interface to show the widget display area 500. The anchor position of the widget display area 500 can be visually indicated in the display interface, such as with a thicker edge 534 of the display area where the widget display area 500 is anchored. The user can similarly engage edge 533B of the widget display area 500 in a top-bottom (and vice versa) fashion to show or hide the widget display area. The interior 500A of the widget display area 500 can also be engaged by the user in a similar fashion from left-right (and vice versa) and top-bottom (and vice versa) to show/hide the widget display area as desired 500. Further, the user can double click (or tap) the interior 500A of the widget display area 500 to hide the widget display area and double click (or tap) the anchor location (which can be visually indicated in the user interface) to show the widget display area 500.

The user can use similar methods to adjust the size of the widget display area 500 within the user interface. For example, the user can select and drag an edge 533A of the widget display area 500 with a focus selector to adjust a width of the widget display area 500. Similarly, the user can select an edge 533B of the widget display area 500 with a focus selector to adjust a length of the widget display area 500. The widget display area 500 can further include a region scroll bar 515 that can be engaged by the user to scroll the widget display area 500 region up and down to scroll through the widgets. Alternatively, by engaging the interior 500A of the widget display area 500 with a focus selector and moving the focus selector substantially parallel to the scroll bar, the user can scroll the region up or down to scroll through the widgets.

The widget display area 500 includes a region having a number of active widgets that display information to the user. The user can manipulate the display size of the widgets and thus the information the widgets display in widget elements 511 in a fashion similar to that of the widget display area 500. For example, an active mail widget 518 can be configured to display email elements 511. The active mail widget 518 can be configured to display an email element 511A, 511B for a fixed number of latest received emails (e.g., two), an email element 511 for each email received within a fixed time frame (e.g., five minutes), or a combination of the two—such as by displaying up to the last five emails received in the last five minutes. The active email widget 518 can be configured to display an email element 511A with three lines of text, such as a line for the recipient "Paul S," the subject "Date Night," and the beginning of the message text "Call for details for an excursion . . . . " By engaging a bottom edge of the email element 511A, the user can manipulate the size of the email element 511A to control how much, or how little, text from the beginning of the message is displayed to the user. For example, email element 511B is displayed with additional lines of text from the beginning of an email message. Widget elements, such as widget element 511A, can further include a scroll bar 567 to scroll through additional information such as message text in an email. After the user engages a widget element to manipulate its size within a particular widget, the new size can be set as the default size for new widget elements within the widget.

In some embodiments, a widget, e.g., email widget 511 can be removed from the set of active widgets in the widget display area 500 by selection of a remove button (−) 509. In an alternative embodiment, the widget elements 511 of an active widget, taking the email widget 518 for example, can be hidden (e.g., elements 511A and 511B) when the user engages a widget hide toggle 509 (e.g., a button indicated with a "−" or other visual indicator). Additionally, when an active widget, taking the weather widget 538 for example, is hidden, the user can engage a widget show toggle 517 (e.g., a button indicated with a "+" or other visual indicator) to display the widget elements (e.g., elements 511F and 511G). In other embodiments, the user can engage the interior 523 of the active widget to hide or show the widget elements 511F, 511G.

Embodiments of active widgets can further include a configuration toggle 507 which the user can engage to configure properties of the active widget, such as the number of widget elements 511 to display, the information contained therein, and so forth. Examples of configuration properties of active widgets are discussed in greater detail below. In some embodiments, the configuration properties are provided in a popup panel separate from the widget display are 500. In other embodiments, the configuration properties can be displayed inline with widgets in the widget display area 500. For example, the active widget selected for configuration can flip over or extend in length to reveal configuration options inline in the area within the widget display area 500 previously occupied by the widget.

Embodiments of active widgets can further include an icon for an application launcher 513 which, like the tray 408 with icons for frequently used applications, launches the application corresponding to the active widget. In the case of application launcher 513 for messaging widget 524, the messaging application (e.g., application 141) is launched when the application launcher 513 is engaged by the user.

Several examples of active widgets illustrated in the widget display area 500 are discussed below. A mail widget 518 can display widget elements 511A, 511B for recently received email. An email widget element 511A includes information indicating the sender of the email, the subject of the email, and text from the message. Configuration options for the mail widget 518 can include a maximum number of widget elements to display and/or a duration specifying how long a widget element should be displayed, and whether to display a date and time the email was received, an email account receiving the email, and/or other information within the widget element 511A.

Similar to the mail widget, a messaging widget 524 can display widget elements 511C for recently received messages (e.g., text messages or similar). A messaging widget element 511C includes information indicating the sender of the message and text from the message. Configuration options for the messaging widget 524 can include a maximum number of widget elements to display and/or a duration specifying how long a widget element should be displayed, and whether to display a date and time the message was received, and/or other information within the widget element 511C.

A calendar widget 526 can display a widget element 511D showing a calendar with a user selected date or a current date. Widget elements 511E can be displayed for upcoming entries in a calendar application and/or for entries associated with a selected date. The calendar widget 526 can also display the current date and/or time, e.g., by updating the icon for the application launcher. A calendar widget element 511D includes information for a calendar entry (e.g., "Sam W's Birthday") along with a date, time, and/or location associated with the calendar entry. Configuration options for the calendar widget 524 can include a maximum number of widget elements to display and/or a duration specifying how far ahead in time a widget element should be displayed for a calendar entry.

A weather widget 538 can display widget elements 511F, 511G indicating future and current weather conditions for a specified location or based on a determined location of the device (e.g., via GPS or other means). A weather widget element 511F can include information indicating current weather conditions in association with a location. A weather widget element 511G can include information indicating upcoming weather conditions in association with a location. For locations that are user specified, the location can be indicated in a weather widget element 511F, 511G via a postal code or location name (e.g., city, state). Configuration options for the calendar widget 524 can include whether to include upcoming and/or current weather conditions for a current location and one or more user specified locations.

A stocks widget (not shown) can display widget elements indicating the value and trends in a stock. A stocks widget element (not shown) can include information indicating the stock name, current value, increase or decrease in value as a monetary and/or percent over a time frame. Configuration options for the stocks widget can include which stocks to include in widget elements and the stock information the user desires to view in the widget element.

The widget display area 500 can further include a preference panel toggle 506. The preference pane toggle can include options for when to display the widget display area 500. For example, when a new widget display element is generated for a widget (e.g., on receipt of an email or message), the widget display area 500 can be shown from a hidden position to notify the user of the newly received email. In some embodiments, the widget display area 500 can be configured to display other notifications such as a battery life warning for the device 300, available updates for the device 300, installation status of an application or widget, and other events.

The widget display area 500 can be displayed in different states. For example, FIG. 5 illustrates an active widget display state while an edit state illustrated in FIGS. 6A and 6B enables the user to add or remove the widgets displayed in the active widget display state. Accordingly the widget display area 500 can include an edit toggle 504, which the user can engage to add or remove widgets in the widget display area 500. In some embodiments, the widget display area 500 includes a new widget notification 505 that visually indicates to the user when a new widget is available (e.g., from opaque to green). Alternatively, or in addition, the edit toggle 504 can change appearance visually to notify the user when a new widget is available. For example, the edit toggle can include a number badge notification 568 indicating the number of newly added widgets that have become available for adding to the active widget display area 500 since the last time that the user viewed the widget area edit state that displays the widgets available for adding to the active widget display area.

FIG. 6A illustrates an exemplary user interface of a widget display area 600 in a second state for adding an active widget for display in the widget display area in accordance with some embodiments. As shown, the display system 112 can display a GUI including the widget display area 600 in the second state. The user interface can also include a task bar 501 presenting various options to the user and a tray 408 with icons for frequently used applications. These applications can have associated widgets that a user can add to or remove from the active region of the widget display area 600. For example, in response to user inputs, the GUI updater 178 can show or hide active widgets and representations of widgets in the different regions of the widget display area 600 on the display system 112.

As shown, the widget display area 600 in the second state includes two regions. The first region 600A includes the active widgets displayed similar to how the widget display area appears in the first state (e.g., widget display area 500 in FIG. 5) and the second region 600B includes a listing of representations of available widgets that can be added to the first region 600A. For example, representations of a browser widget 620, notes widget 644, and stocks widget 634A are displayed. Other representations of widgets 623 can be displayed in a similar fashion. The representations of widgets 620, 644, 634A can be visually smaller in the second region 600B than their active counterparts in the first region 600A.

The second region 600B can further include a region scroll bar 615 that can be engaged by the user to scroll up or down through the representations of widgets, initiating a scrolling request. Alternatively, by engaging the interior of the second region 600B with a focus selector and moving the focus selector substantially parallel to the scroll bar, the user can scroll the second region 600B up or down to scroll through the representations of the widgets. Additionally, although not shown in FIG. 6A, the first region 600A can include a region scroll bar (e.g., as illustrated in FIG. 5) that can be engaged by the user to scroll up or down through the active widgets. Alternatively, by engaging the interior of the first region 600A with a focus selector and moving the focus selector substantially parallel to the scroll bar (not shown), the user can scroll the first region 600A up or down to scroll through the active widgets. The region scrolls can be performed independently within each region 600A, 600B such that the user can scroll the first region 600A up or down independent of the second region 600B and vice versa.

As shown in the second region 600B, the listing of representations of widgets that can be added to the first region 600A of active widgets include a browser widget 620, notes widget 644, and stocks widget 634A. The representations of widgets in the second region 600B can be engaged with in different ways by the user for adding active widgets in the first region 600A. In some embodiments, a representation of a widget (e.g., the stocks widget representation 634A) includes an add widget button 603. When the add widget button 603 is engaged, a new active widget 634B corresponding to the representation of the widget 634A is added to the first region 600A. In some embodiments, when the new active widget 634B is added to the first region 600A, the corresponding representation of the widget 634A is removed from the listing of available widgets in the second region 600B.

In another embodiment, with a focus selector positioned over a given representation of a widget, the representation of the widget can be selected (e.g., initiation of user contact with the touch-sensitive surface) within the second region 600B and dropped (release of user content with the touch-sensitive surface) with the focus selector positioned over the first region 600A to include a new active widget corresponding to the representation of the widget in the first region 600A. The order or placement of active widgets within the first region 600A can be altered in a similar fashion by manipulating the position of a selected active widget to be above or below another active widget.

When a representation of a widget (e.g., the representation of the stocks widget 634A) is added to the first region 600A with active widgets, the active widget (e.g., active stocks widget 634B) and the widget elements (e.g., 619) are displayed in the first region 600A based on the widget configuration. For example, widget element 619A displays a selection of stocks and 619B provides stock trend information for a selected stock. In some embodiments, in response to the representation of a widget being added to the first region 600A, the configuration options for the widget are automatically displayed to the user. If the user chooses to alter the configuration options, the display of the active widget and associated widget display elements in the first region 600A are updated, e.g., to include live data. The updating of the active widget and associated widget display elements can be performed in real time such that the widgets in region 600A provide an accurate representation of their presentation of the first state, or periodically.

In some instances, the user can intend not to include a representation of a widget in the listing of available widgets in the second region 600B. A delete widget button 605 associated with each widget can be engaged to remove the corresponding representation of the widget from the second region 600B. In a further example, widgets can be dragged and dropped between the available and active widget regions.

In some embodiments, the second region 600B can include a widget template (not shown) that the user can configure to create a user defined widget. The widget template can provide the option to configure a row-based widget (e.g., which displays rows of information). For example, the user can configure the user defined widget to display rich site summary (RSS) feed notifications. In another embodiment, the widget template can provide the option to configure a blank-canvas widget (e.g., which displays graphics positioned within the canvas to the user). For example, the user can configure the user defined widget to display a particular web page or HTML element. The user defined widget can also include the option to associate a particular application with the widget which can be launched through the icon displayed in association with the active widget.

Once the user has added the desired widgets, the user can exit the edit state by engaging the edit toggle 504, which displays Done in this state. In turn, the widget display area 600 returns to the first state illustrated in FIG. 5. A transition between the first state illustrated in FIG. 5 and the second state illustrated in FIG. 6A can be animated. For example, during a transition from the first state to the second state, the widget display area 600 can expand outwards (i.e., slide) from the anchor location (e.g., edge 534) to show the second region 600B. During a transition from the second state to the first state, the widget display area 600 can collapse inwards (i.e., slide) to the anchor location (e.g., edge 534) to hide the second region 600B.

FIG. 6B illustrates an exemplary user interface of a widget display area 600 in a second state for removing an active widget displayed in the widget display area in accordance with some embodiments. As shown, the display system 112 can display a GUI including the widget display area 600 in the second state. The user interface can also include a task bar 501 presenting various options to the user and a tray 408 with icons for frequently used applications. These applications can have associated widgets that a user can add to or remove from the active region of the widget display area 600. For example, in response to user inputs, the GUI updater 178 can show or hide active widgets and representations of widgets in the different regions of the widget display area 600 on the display system 112.

As shown, the widget display area 600 in the second state includes two regions. The first region 600A includes the active widgets that are to be displayed when the widget display area is in the first state (e.g., widget display area 500 in FIG. 5) and the second region 600B includes a listing of representations of widgets that can be added to the first region 600A. For example, representations of a browser widget 620 are notes widget 644. Other representations of widgets 623 can be displayed in a similar fashion. Also, as shown, the first region 600A includes a number of active widgets, such as a mail widget 518, messaging widget 524, calendar widget 526, weather widget 538, and stocks widget 634B that can be removed from the active widget display region 600A.

The second region 600B can further include a scroll bar 615 that can be engaged by the user to scroll the representations of widgets up and down. Alternatively, by engaging the interior of the second region 600B with a focus selector and moving the focus selector substantially parallel to the scroll direction, the user my scroll through the representations of the widgets. Additionally, although not shown in FIG. 6A, the first region 600A can include a scroll bar (e.g., as illustrated in FIG. 5) that can be engaged by the user to scroll the active widgets up and down. Alternatively, by engaging the interior of the first region 600A with a focus selector and moving the focus selector substantially parallel to the scroll direction, the user my scroll through the active widgets. Thus, the first region 600A and the second region 600B can be independently scrolled.

The active widgets in the first region 600A can be engaged with in different ways by the user for removing active widgets in the first region 600A. In some embodiments, each active widget (e.g., the active stocks widget 634B) includes a remove widget button 629. When the remove widget button 629 is engaged, the corresponding active widget 634B is removed from the first region 600A. In the displayed embodiment, the remove widget button 629 displays an X symbol. In another embodiment, the remove widget button 629 displays a minus (−) symbol. Thus, when the widget display area 600 is collapsed to the first state, the removed active widget 634B is no longer displayed. In some embodiments, when an active widget 634B is removed from the first region 600A, the corresponding representation of the widget 634A is added to the listing of available widgets in the second region 600B. In a further example, widgets can be dragged and dropped between the available and active widget regions.

In another embodiment, with a focus selector positioned over a given active widget, the active widget can be selected (e.g., initiation of user contact with the touch-sensitive surface) within the first region 600A and dropped (release of user content with the touch-sensitive surface) with the focus selector positioned over the second region 600B to remove the active widget. In addition, widgets can be reordered within each region 600A, B by dragging and dropping within the column of the region.

Once the user has removed the desired active widgets, the user can exit the edit state by engaging the edit toggle 504. In turn, the widget display area 600 returns to the first state illustrated in FIG. 5. A transition between the first state illustrated in FIG. 5 and the second state illustrated in FIG. 6B can be animated. For example, during a transition from the first state to the second state, the widget display area 600 can expand outwards from the anchor location (e.g., edge 534) to show the second region 600B. During a transition from the second state to the first state, the widget display area 600 can collapse inwards to the anchor location (e.g., edge 534) to hide the second region 600B.

FIG. 7 is a flow chart depicting a method 700 for displaying an active widget display area and transitioning the widget display area between a first state and a second state in accordance with some embodiments. The method 700 is performed at an electronic device (e.g., device 300, FIG. 3, or portable multifunction device 100, FIG. 1A) with a display and a touch-sensitive surface or other input means. In some embodiments, the display is a touch screen display and the touch-sensitive surface is on the display. In some embodiments, the display is separate from the touch-sensitive surface. Some operations in method 700 are, optionally, combined and/or the order of some operations is, optionally, changed.

The device receives a first user input 705 to display 715 a widget display area in a first state. The first user input 705 can include the engaging of a widget display toggle element configured to show or hide the widget display area in the first state. For example, the user can engage the widget display toggle configured to transition the display of the widget display area from a hidden state to the first state. The transition can include expanding the widget display area from the anchor location to the first state including a first region with active widgets. Other examples of the first user input 705 can include user engagement of a touch-sensitive surface to swipe or drag the widget display area into view from an anchor location or otherwise engaging the anchor location (e.g., clicking) to show the widget display area. The anchor location can visually indicate to the user the placement of the widget display area when hidden.

In response to the first user input 705, the widget display area is displayed 715 in a first state comprising the first region displaying a plurality of active widgets. The active widgets display information to the user based on their respective configurations. For example, an active weather widget can include a number of widget elements to display current or upcoming weather conditions and an active email widget can include a number of widget elements to display recently received emails. Active widgets can include a configuration toggle which the user can engage to configure properties of the active widget, such as the number of widget elements to display, the information contained therein, and so forth.

The device can subsequently receive a second user input 725 while the widget display area is displayed in the first state to display the widget display area in a second state for editing the widget display area. For example, the user can engage an edit toggle configured to transition the display of the widget display area from the first state to the second state when the widget display area is in the first state. In response to the second user input 725, the widget display area can be expanded 735 to the second state, which includes the first region displaying the active widgets and a second region comprising a plurality of representations of widgets available for adding to the first region.

A third user input can be received 745 while the widget display area is displayed in the second state in order to return the widget display area to the first state. For example, the user can engage the edit toggle configured to transition the display of the widget display area from the second state to the first state when the widget display area is in the second state. In response to the third user input 745, the widget display area in the second state is collapsed 755 to the first state.

In turn, the widget display toggle element configured to show or hide the widget display area can be engaged while the widget display area is displayed in the first state to hide the widget display area. Other examples of input to hide the widget display area can include user engagement of a touch-sensitive surface to swipe or drag the widget display area from view to the anchor location or otherwise engaging the widget display area or anchor location (e.g., clicking) to hide the widget display area. In some embodiments, a transition from the first state to the hiding the widget display area comprises collapsing the widget display area to the anchor location, which can visually indicate to the user the placement of the widget display area when hidden. The above steps can be repeated to show or hide the widget display area and transition the widget display area between states.

FIG. 8A is a flow chart depicting a method 800A for adding a widget for display in a widget display area in accordance with some embodiments. The method 800A is performed at an electronic device (e.g., device 300, FIG. 3, or portable multifunction device 100, FIG. 1A) with a display and a touch-sensitive surface or other input means. In some embodiments, the display is a touch screen display and the touch-sensitive surface is on the display. In some embodiments, the display is separate from the touch-sensitive surface. Some operations in method 800A are, optionally, combined and/or the order of some operations is, optionally, changed.

As described with reference to FIG. 7, a third user input can be received 745 while the widget display is display in the second state. In response to the third user input, a target widget in the plurality of representations of widgets available for adding to the first region can be added or placed 801 amongst the plurality of active widgets displayed in the first region to add and display the target widget in an active state in the first region.

Examples of the third user input can include engaging an add widget button associated with the representation of the target widget in the second region. When the add widget button is engaged, the target widget is added to the first region and displayed in an active state. In another embodiment, with a focus selector positioned over the representation of the target widget, the representation of the widget can be selected (e.g., initiation of user contact with the touch-sensitive surface) within the second region and dropped (release of user content with the touch-sensitive surface) with the focus selector positioned over the first region to add the target widget corresponding to the representation of the target widget in the first region. In some embodiments, when the target widget is added to the first region, the representation of the target widget within the second region is removed.

A fourth user input can be received 803 while the widget display area is displayed in the second state in order to return the widget display area to the first state. For example, the user can engage the edit toggle configured to transition the display of the widget display area from the second state to the first state when the widget display area is in the second state. In response to the forth user input 803, the widget display area in the second state is collapsed 805 to the first state with the first region displaying the plurality of active widgets and the target widget in the active state.

FIG. 8B is a flow chart depicting a method 800B for removing a widget from display in a widget display area in accordance with some embodiments. The method 800B is performed at an electronic device (e.g., device 300, FIG. 3, or portable multifunction device 100, FIG. IA) with a display and a touch-sensitive surface or other input means. In some embodiments, the display is a touch screen display and the touch-sensitive surface is on the display. In some embodiments, the display is separate from the touch-sensitive surface. Some operations in method 800B are, optionally, combined and/or the order of some operations is, optionally, changed.

As described with reference to FIG. 7, a third user input can be received 745 while the widget display is display in the second state. In response to the third user input, a target widget in the plurality of active widgets can be removed 807 and displayed amongst the plurality of representation of widget in the second region.

Examples of the third user input can include engaging a remove widget button associated with the target widget in the first region. When the remove widget button is engaged, the target widget is removed from the first region and a representation of the target widget is displayed amongst the plurality of representations of widgets in the second region. In another embodiment, with a focus selector positioned over the target widget, the active target widget can be selected (e.g., initiation of user contact with the touch-sensitive surface) within the first region and dropped (release of user content with the touch-sensitive surface) with the focus selector positioned over the second region to remove the target widget from the first region. In turn, a representation of the target widget can be generated in the second region displaying representations of widgets available for adding to the first region.

A fourth user input can be received 809 while the widget display area is displayed in the second state in order to return the widget display area to the first state. For example, the user can engage the edit toggle configured to transition the display of the widget display area from the second state to the first state when the widget display area is in the second state. In response to the forth user input 809, the widget display area in the second state is collapsed 811 to the first state with the first region displaying the plurality of active widgets less the target widget removed from the first region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein can be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a tangible computer readable storage medium or any type of media suitable for storing electronic instructions, and coupled to a computer system bus. Furthermore, any computing systems referred to in the specification can include a single processor or can be architectures employing multiple processor designs for increased computing capability.

Embodiments of the invention can also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it can not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for accessing a widget display area on a device with a display and one or more input devices, the method comprising:
   displaying, on the display, the widget display area in a first state, the first state comprising a first region, the first region comprising a plurality of active widgets that include a visual indication of a state of the widget;

displaying, on the display, in response to a receiving first input, via the one or more input devices, while the widget display area is displayed in the first state, the widget display area in a second state comprising the first region and a second region, the second region comprising a plurality of representations of widgets that are available for adding to the first region;

receiving a second input, via the one or more input devices, while the widget display area is displayed in the second state, the second input selecting a target widget in the plurality of representations of widgets available for adding to the first region;

adding, in response to receiving the second input, the target widget amongst the plurality of active widgets displayed in the first region; and detecting installation of an application having an associated widget to the device and automatically adding the associated widget to the second region without adding the associated widget to the first region.

2. The method of claim 1, wherein at least one active widget in the plurality of active widgets includes information from an external source, the information comprising one or more of weather data, stock data, calendar data, time data, recent messages, and information received from an application executing on the device.

3. The method of claim 1, wherein at least one active widget in the plurality of active widgets includes a representation of information from an external source that is updated periodically while the second region is displayed.

4. The method of claim 1, wherein:
displaying the widget display area in the first state in response to the first input includes sliding the first region onto the display in a first direction from a first edge of the display; and
displaying the widget display area in the second state in response to the second input includes sliding the second region onto the display in a first direction from a first edge of the display and sliding the first region in the first direction.

5. The method of claim 1, wherein the associated widget is retrieved from an external source in response to the detecting of the installation of the application.

6. The method of claim 5, wherein the associated widget is included in an application package with the application.

7. The method of claim 1, wherein visually indicating in the first state the adding of the target widget by updating a badge notification.

8. The method of claim 1, further comprising displaying, on the display, widget configuration options for the target widget in response to adding the target widget amongst the plurality of active widget displayed in the first region.

9. The method of claim 8, wherein at least one configuration option is set automatically based on one or more of a prior configuration of the target widget and determined geographical information.

10. The method of claim 1, further comprising removing the representation of the target widget from the second region in response to adding the target widget amongst the plurality of active widget displayed in the first region.

11. A method for accessing a widget display area on a device with a display and one or more input devices, the method comprising:
displaying, on the display, in response to receiving a first input, via the one or more input devices, the widget display area in a first state, the first state comprising a first region, the first region comprising a plurality of active widgets that include a visual indication of a state of the widget;

displaying, on the display, in response to a receiving second input, via the one or more input devices, while the widget display area is displayed in the first state, the widget display area in a second state comprising the first region and a second region, the second region comprising a plurality of representations of widgets that are available for adding to the first region, where a transition from the first state to the second state is animated by expanding the widget display area to include the second region;

displaying, on the display, in response to a receiving a third input, via the one or more input devices, while the widget display area is displayed in the second state, the widget display area in the first state, where a transition from the second state to the first state is animated by collapsing the widget display area to remove the second region; and detecting installation of an application having an associated widget to the device and automatically adding the associated widget to the second region without adding the associated widget to the first region.

12. The method of claim 11, further comprising:
receiving a forth input, via the one or more input devices, prior to the third input while the widget display area is displayed in the second state, the fourth input selecting a target widget in the plurality of representations of widgets available for adding to the first region; and
adding, in response to the fourth input, the target widget amongst the plurality of active widgets displayed in the first region.

13. The method of claim 11, further comprising:
receiving a fourth input, via the one or more input devices, prior to the third input while the widget display area is displayed in the second state, the fourth input selecting a target widget in the plurality of active widgets; and
removing, in response to the fourth input, the target widget from amongst the plurality of active widgets displayed in the first region.

14. The method of claim 13, further comprising displaying, on the display, in response to receiving the fourth input, via the one or more input devices, the target widget amongst the plurality of representation of widgets in the second region available for adding to the first region.

15. A method for accessing a widget display area on a device with a display and one or more input devices, the method comprising:
displaying, on the display, the widget display area in a first state, the first state comprising a first region, the first region comprising a plurality of active widgets that include a visual indication of a state of the widget;

displaying, on the display, in response to receiving a first input, via the one or more input devices, while the widget display area is displayed in the first state, the widget display area in a second state comprising the first region and a second region, the second region comprising a plurality of representations of widgets that are available for adding to the first region;

receiving a second input, via the one or more input devices, while the widget display area is displayed in the second state, the second input selecting a target widget in the plurality of active widgets;

removing, in response to receiving the second input, the target widget from amongst the plurality of active widgets displayed in the first region;

displaying, on the display, in response to receiving a third input, via the one or more input devices, while the widget display area is displayed in the second state, the widget display area in the first state, the first region displaying the plurality of active widgets less the target widget; and detecting installation of an application having an associated widget to the device and automatically adding the associated widget to the second region without adding the associated widget to the first region.

16. A non-transitory computer readable storage medium having instructions stored therein, which when executed by a processor, cause the processor to perform operations for accessing a widget display area on a device with a display and one or more input devices, the operations comprising:

displaying, on the display, the widget display area in a first state, the first state comprising a first region, the first region comprising a plurality of active widgets that include a visual indication of a state of the widget;

displaying, on the display, in response to receiving a first input, via the one or more input devices, while the widget display area is displayed in the first state, the widget display area in a second state comprising the first region and a second region, the second region comprising a plurality of representations of widgets that are available for adding to the first region;

receiving a second input, via the one or more input devices, while the widget display area is displayed in the second state, the second input selecting a target widget in the plurality of representations of widgets available for adding to the first region;

adding, in response to receiving the second input, the target widget amongst the plurality of active widgets displayed in the first region; and detecting installation of an application having an associated widget to the device and automatically adding the associated widget to the second region without adding the associated widget to the first region.

17. A device, comprising:
a display;
one or more input devices;
a processor; and
a memory coupled to the processor for storing instructions for accessing a widget display area on the device, which when executed cause the processor to:

display, on the display, the widget display area in a first state, the first state comprising a first region, the first region comprising a plurality of active widgets that include a visual indication of a state of the widget;

display, on the display, in response to receiving a first input, via the one or more input devices, while the widget display area is displayed in the first state, the widget display area in a second state comprising the first region and a second region, the second region comprising a plurality of representations of widgets that are available for adding to the first region;

receive a second input, via the one or more input devices, while the widget display area is displayed in the second state, the second input selecting a target widget in the plurality of representations of widgets available for adding to the first region;

add, in response to receiving the second input, the target widget amongst the plurality of active widgets displayed in the first region; and detect installation of an application having an associated widget to the device and automatically add the associated widget to the second region without adding the associated widget to the first region.

18. A non-transitory computer readable storage medium having instructions stored therein, which when executed by a processor, cause the processor to perform operations for accessing a widget display area on a device with a display and one or more input devices, the operations comprising:

displaying, on the display, in response to receiving a first input, via the one or more input devices, the widget display area in a first state, the first state comprising a first region, the first region comprising a plurality of active widgets that include a visual indication of a state of the widget;

displaying, on the display, in response to receiving a second input, via the one or more input devices, while the widget display area is displayed in the first state, the widget display area in a second state comprising the first region and a second region, the second region comprising a plurality of representations of widgets that are available for adding to the first region, where a transition from the first state to the second state is animated by expanding the widget display area to include the second region;

displaying, on the display, in response to receiving a third input, via the one or more input devices, while the widget display area is displayed in the second state, the widget display area in the first state, where a transition from the second state to the first state is animated by collapsing the widget display area to remove the second region; and detecting installation of an application having an associated widget to the device and automatically adding the associated widget to the second region without adding the associated widget to the first region.

19. A device, comprising:
a display;
one or more input devices;
a processor; and
a memory coupled to the processor for storing instructions for accessing a widget display area on the device, which when executed cause the processor to:

display, on the display, in response to receiving a first input, via the one or more input devices, the widget display area in a first state, the first state comprising a first region, the first region comprising a plurality of active widgets that include a visual indication of a state of the widget;

display, on the display, in response to receiving a second input, via the one or more input devices, while the widget display area is displayed in the first state, the widget display area in a second state comprising the first region and a second region, the second region comprising a plurality of representations of widgets that are available for adding to the first region, where a transition from the first state to the second state is animated by expanding the widget display area to include the second region;

display, on the display, in response to receiving a third input, via the one or more input devices, while the widget display area is displayed in the second state, the widget display area in the first state, where a transition from the second state to the first state is animated by collapsing the widget display area to remove the second region; and detect installation of an application having an associated widget to the device and automatically add the associated widget to the second region without adding the associated widget to the first region.

20. A non-transitory computer readable storage medium having instructions stored therein, which when executed by a processor, cause the processor to perform operations for accessing a widget display area on a device, the operations comprising:
displaying on the display, the widget display area in a first state, the first state comprising a first region, the first region comprising a plurality of active widgets that include a visual indication of a state of the widget;
displaying, on the display, in response to receiving a first input, via the one or more input devices, while the widget display area is displayed in the first state, the widget display area in a second state comprising the first region and a second region, the second region comprising a plurality of representations of widgets that are available for adding to the first region;
receiving a second input, via the one or more input devices, while the widget display area is displayed in the second state, the second input selecting a target widget in the plurality of active widgets;
removing, in response to receiving the second input, the target widget from amongst the plurality of active widgets displayed in the first region;
displaying, on the display, in response to receiving a third input, via the one or more input devices, while the widget display area is displayed in the second state, the widget display area in the first state, the first region displaying the plurality of active widgets less the target widget; and
detecting installation of an application having an associated widget to the device and automatically adding the associated widget to the second region without adding the associated widget to the first region.

21. A device, comprising:
a display;
one or more input devices;
a processor; and
a memory coupled to the processor for storing instructions for accessing a widget display area on the device, which when executed cause the processor to:
display on the display, the widget display area in a first state, the first state comprising a first region, the first region comprising a plurality of active widgets that include a visual indication of a state of the widget;
display, on the display, in response to receiving a first input, via the one or more input devices, while the widget display area is displayed in the first state, the widget display area in a second state comprising the first region and a second region, the second region comprising a plurality of representations of widgets that are available for adding to the first region;
receive a second input, via the one or more input devices, while the widget display area is displayed in the second state, the second input selecting a target widget in the plurality of active widgets;
remove, in response to receiving the second input, the target widget from amongst the plurality of active widgets displayed in the first region;
display, on the display, in response to receiving a third input, via the one or more input devices, while the widget display area is displayed in the second state, the widget display area in the first state, the first region displaying the plurality of active widgets less the target widget; and
detect installation of an application having an associated widget to the device and automatically add the associated widget to the second region without adding the associated widget to the first region.

22. The method of claim 1, wherein the application is a different software program from the associated widget.

23. The non-transitory computer readable storage medium of claim 16, wherein at least one active widget in the plurality of active widgets includes information from an external source, the information comprising one or more of weather data, stock data, calendar data, time data, recent messages, and information received from an application executing on the device.

24. The non-transitory computer readable storage medium of claim 16, wherein at least one active widget in the plurality of active widgets includes a representation of information from an external source that is updated periodically while the second region is displayed.

25. The non-transitory computer readable storage medium of claim 16, wherein:
displaying the widget display area in the first state in response to the first input includes sliding the first region onto the display in a first direction from a first edge of the display; and
displaying the widget display area in the second state in response to the second input includes sliding the second region onto the display in a first direction from a first edge of the display and sliding the first region in the first direction.

26. The non-transitory computer readable storage medium of claim 16, wherein the associated widget is retrieved from an external source in response to the detecting of the installation of the application.

27. The non-transitory computer readable storage medium of claim 16, wherein the associated widget is included in an application package with the application.

28. The non-transitory computer readable storage medium of claim 16, wherein visually indicating in the first state the adding of the target widget by updating a badge notification.

29. The non-transitory computer readable storage medium of claim 16, wherein the instructions further cause the processor to perform operations comprising:
displaying, on the display, widget configuration options for the target widget in response to adding the target widget amongst the plurality of active widget displayed in the first region.

30. The non-transitory computer readable storage medium of claim 29, wherein at least one configuration option is set automatically based on one or more of a prior configuration of the target widget and determined geographical information.

31. The non-transitory computer readable storage medium of claim 16, wherein the instructions further cause the processor to perform operations comprising:
removing the representation of the target widget from the second region in response to adding the target widget amongst the plurality of active widget displayed in the first region.

32. The non-transitory computer readable storage medium of claim 16, wherein the application is a different software program from the associated widget.

33. The device of claim 17, wherein at least one active widget in the plurality of active widgets includes information from an external source, the information comprising one or more of weather data, stock data, calendar data, time data, recent messages, and information received from an application executing on the device.

34. The device of claim 17, wherein at least one active widget in the plurality of active widgets includes a representation of information from an external source that is updated periodically while the second region is displayed.

35. The device of claim 17, wherein:
displaying the widget display area in the first state in response to the first input includes sliding the first region onto the display in a first direction from a first edge of the display; and
displaying the widget display area in the second state in response to the second input includes sliding the second region onto the display in a first direction from a first edge of the display and sliding the first region in the first direction.

36. The device of claim 17, wherein the associated widget is retrieved from an external source in response to the detecting of the installation of the application.

37. The device of claim 17, wherein the associated widget is included in an application package with the application.

38. The device of claim 17, wherein visually indicating in the first state the adding of the target widget by updating a badge notification.

39. The device of claim 17, wherein the instructions further cause the processor to:
display, on the display, widget configuration options for the target widget in response to adding the target widget amongst the plurality of active widget displayed in the first region.

40. The device of claim 39, wherein at least one configuration option is set automatically based on one or more of a prior configuration of the target widget and determined geographical information.

41. The device of claim 17, wherein the instructions further cause the processor to:
remove the representation of the target widget from the second region in response to adding the target widget amongst the plurality of active widget displayed in the first region.

42. The device of claim 17, wherein the application is a different software program from the associated widget.

43. The non-transitory computer readable storage medium of claim 18, wherein the instructions further cause the processor to perform operations comprising:
receiving a forth input, via the one or more input devices, prior to the third input while the widget display area is displayed in the second state, the fourth input selecting a target widget in the plurality of representations of widgets available for adding to the first region, and
adding, in response to the fourth input, the target widget amongst the plurality of active widgets displayed in the first region.

44. The non-transitory computer readable storage medium of claim 18, wherein the instructions further cause the processor to perform operations comprising:
receiving a fourth input, via the one or more input devices, prior to the third input while the widget display area is displayed in the second state, the fourth input selecting a target widget in the plurality of active widgets, and
removing, in response to the fourth input, the target widget from amongst the plurality of active widgets displayed in the first region.

45. The non-transitory computer readable storage medium of claim 44, wherein the instructions further cause the processor to perform operations comprising:
displaying, on the display, in response to receiving the fourth input, via the one or more input devices, the target widget amongst the plurality of representation of widgets in the second region available for adding to the first region.

46. The device of claim 19, wherein the instructions further cause the processor to:
receive a forth input, via the one or more input devices, prior to the third input while the widget display area is displayed in the second state, the fourth input selecting a target widget in the plurality of representations of widgets available for adding to the first region, and
add, in response to the fourth input, the target widget amongst the plurality of active widgets displayed in the first region.

47. The device of claim 19, wherein the instructions further cause the processor to:
receive a fourth input, via the one or more input devices, prior to the third input while the widget display area is displayed in the second state, the fourth input selecting a target widget in the plurality of active widgets, and
remove, in response to the fourth input, the target widget from amongst the plurality of active widgets displayed in the first region.

48. The device of claim 47, wherein the instructions further cause the processor to:
display, on the display, in response to receiving the fourth input, via the one or more input devices, the target widget amongst the plurality of representation of widgets in the second region available for adding to the first region.

* * * * *